United States Patent
Gassler (10) Patent No.: US 6,837,389 B2
(45) Date of Patent: Jan. 4, 2005

(54) PROFILE-SECTION SUPPORT SYSTEM FOR INDUSTRIAL-FAIR AND EXHIBITION CONSTRUCTION

(75) Inventor: Kurt Gassler, Sonnenbuehl (DE)

(73) Assignee: DOMO Architektursystems Logistic GmbH, Sonnenbuehl (DE)

( * ) Notice: Subject to any disclaimer, the term of this patent is extended or adjusted under 35 U.S.C. 154(b) by 114 days.

(21) Appl. No.: 10/292,568

(22) Filed: Nov. 12, 2002

(65) Prior Publication Data

US 2003/0089674 A1 May 15, 2003

(30) Foreign Application Priority Data

Nov. 15, 2001 (DE) .......................................... 101 56 220

(51) Int. Cl.⁷ .................................................. A47F 5/00
(52) U.S. Cl. .................. 211/189; 211/182; 248/222.12; 248/297.21; 248/223.41
(58) Field of Search ................................ 211/182, 189, 211/190, 191; 52/737.2, 737.6; 312/265.1, 265.4; 403/263, 247, 248; 248/231.21, 222.12, 297.21, 223.41, 224.51, 224.61

(56) References Cited

U.S. PATENT DOCUMENTS

| | | | | |
|---|---|---|---|---|
| 3,574,367 A | * | 4/1971 | Jankowski | .................. 403/201 |
| 3,966,342 A | * | 6/1976 | Moriya | ......................... 403/256 |
| 4,163,537 A | * | 8/1979 | Mourgue | .................. 248/188.1 |
| 6,119,317 A | * | 9/2000 | Pfister | ........................... 24/514 |
| 6,179,511 B1 | * | 1/2001 | Gassler | ..................... 403/322.1 |
| 6,223,917 B1 | * | 5/2001 | Bruder | ........................ 211/189 |
| 6,402,420 B1 | * | 6/2002 | Yang | ............................ 403/381 |
| 6,442,805 B2 | * | 9/2002 | Pfister | ........................... 24/514 |

FOREIGN PATENT DOCUMENTS

DE      38 43 911 A1    6/1990

\* cited by examiner

Primary Examiner—Robert W. Gibson, Jr.
(74) Attorney, Agent, or Firm—Michael J. Striker (57) ABSTRACT

A profile-section support system, in particular, for industrial-fair and exhibition construction, has hollow profile-section supports (10) of polygonal cross section, which on at least one of their outer sides (14, 15, 16, 17), along the edges with ribs (18, 19, 20, 21), which between them enclosed grooves (22) with peripheral undercuts for anchoring fast-action connecting elements (43, 44, 63) for connecting further profile-section supports (10) or other parts, and which in the corner regions in the interior are provided with inner corner grooves (23). Spreading apart of the ribs (18, 19, 20, 21) with deformation of the hollow profile-section side (14, 15, 16, 17) enclosed between them is thereby possible. On outer sides (14, 16, 17) adjoining one another of the hollow profile-section supports (10), ribs are disposed. Two ribs (18, 19, 20, 21) on the edge, between the adjacent outer sides (14, 16, 17) of the hollow profile-section support (10), between them enclose an outer corner groove (24).

16 Claims, 7 Drawing Sheets

PROFILE-SECTION SUPPORT SYSTEM FOR INDUSTRIAL-FAIR AND EXHIBITION CONSTRUCTION

BACKGROUND OF THE INVENTION

The present invention relates to a profile-section support system, in particular, for industrial-fair and exhibition construction, with hollow profile-section supports of polygonal cross section, which on at least one of their outer sides, along the edges with ribs, which between them enclosed grooves with peripheral undercuts for anchoring fast-action connecting elements for connecting further profile-section supports or other parts, and which in the corner regions in the interior are provided with inner corner grooves, so that spreading apart of the ribs with deformation of the hollow profile-section support side enclosed between them is possible.

A profile-section support is shown and disclosed in DE 38 43 911 C2. With this known profile-section support, a disadvantage is associated that upon spreading out of the ribs limited by the grooves upon insertion of a fast-action connecting element, also the profile-section sides connected by means of the corner are heavily loaded.

The present invention addresses the underlying problem of providing an improved profile-section support, in which a complete force-related balancing out or neutralization of the profile-section sides is provided.

SUMMARY OF THE INVENTION

This problem is resolved with a profile-section system of the present invention, in which ribs are disposed on adjoining outer sides of the hollow profile-section support, whereby both ribs, on the edge between the adjoining outer sides of the hollow profile-section support, enclose an outer corner groove. Instead of the squared corner on the profile-section outer side provided in the known profile-section, now a groove between the ribs of adjacent profile-section sides is provided, which permits an isolated spreading of one of the ribs, without leading to a force transfer on the adjacent profile-section side.

In the outer corner grooves, likewise peripheral undercuts for receiving attachment elements, so that the outer corner grooves also can serve for connecting components.

With a preferred form of the present invention, the inner and outer corner grooves are formed such that, between them, they enclose a rotational axis for the spreading movement of the two ribs that limit the outer corner groove. Between the two grooves, then, a relatively thin-walled point of the profile-section is provided, which forms the rotational axis for the two ribs. IN addition, the peripheral undercuts of the grooves on the hollow profile-section outer sides and the peripheral undercuts of the outer corner grooves can be disposed such that they enclose between them rotational axes for a pivoting movement of the region formed the peripheral undercuts of the ribs. Thus, it is therefore possible to spread the ribs not only in their full length, but also in their outer region. Also, with this feature, a transfer of force from one profile-section side to the adjoining profile-section side upon spreading of the ribs is avoided. In connection therewith, in addition, it is especially advantageous if the ribs, which contain or enclose the rotational-axes there between, are at least partially slanted in the direction of the inner side of the groove. If these ribs are spread upon insertion of fast-action connecting elements, then this does not lead to an outwardly slanted positioning of the ribs, rather to a straightening perpendicular to the profile-section outer side. In this manner, the ribs are in the position to receive the forces on their front sides than with an outward positioning by means of spreading. In this regard, the inner and outer corner grooves are disposed and shaped such that an impact or tensile stress on the face ends of the ribs is linearly transferred to the opposite side of the hollow profile-section support, and no compression or expansion of the cross section of the hollow profile-section support takes place. Thus, very large forces can be received from the rib front sides, without detrimentally affecting the stability of the profile-section support system.

Should sliding blocks be braced in the grooves, then in addition, in respective sections of the ribs, which limit the undercuts of the grooves on the hollow profile-section support side, small additional grooves for receiving the edges of spring elements are provided, which cooperate with the sliding blocks that can be anchored in the groove formed by the ribs.

The profile-section supports can have a desired polygonal cross section. In addition, it is possible that the profile-sections supports are subdivided into a plurality of chambers. In this manner, also greater profile-section cross sections with a correspondingly higher stability can be produced. Particularly advantageous is providing chambers that have at least approximately square cross sections, since this provides a particularly symmetrical force ratio.

Further advantages are provided when the profile-section supports, at those points where the chamber partitions abut the outer profile walls, have middle ribs protruding outward, which between them and/or ribs disposed on the outer edge regions of the profile-section supports, enclose grooves with peripheral undercuts. With this form of the invention, the profile-section supports then have multiple parallel grooves on their outer sides, in which, respectively, fast-action connecting elements can be secured. The middle ribs, therefore, can be rigidly arranged and the grooves, which are between the middle ribs and the outer ribs, are enclosed, preferably their middle axis is asymmetrically enclosed. If a fast-action connecting element were to be introduced into such a groove, then the outer rig is simply spread outwardly, while the inner rib is not moved or deformed. Through an asymmetrical arrangement, whereby in particular, also the groove opening with reference to the middle axis of the groove can be asymmetrical, the introduction of the connecting elements into the groove is facilitated.

In addition, an important advantage is achieved in that the same fast-action connecting elements are anchorable in the grooves that are also anchorable in the side grooves of single-chamber hollow profile-section supports without middle ribs. The entire profile-section support system then becomes independent of the cross section of the individual profile-section supports, with a unitary assembly of connecting elements.

A preferred form of the fast-action connecting elements have a U-shaped leaf spring, whose legs are shaped into locking lugs that engage the groove provided with an undercut, and that can be braced by means of spreading apart of the legs in the groove by means of a body of rotation that is actuatable by a wrench. These fast-action connecting elements are quickly insertable and connectable, as the name implies. In addition, no stops for limiting the closing position of the body of rotation are disposed on the fast-action connecting element, so it can be avoided that eventually, the wrench breaks from too strong of a pulling action. In addition, the body of rotation can be actuatable by means of a simple socket wrench, having a preferably rectangular cross section. The introduction of such a wrench is simpler than, for example, that of a hollow wrench. In addition, with such a socket wrench, also with very frequent use and expenditure of large fiction forces, the edges are not worn off, which is noticed now and again with hollow wrenches.

BRIEF DESCRIPTION OF THE DRAWINGS

FIGS. 3a through 3p are different polygonal hollow profile-section support cross sections;

FIG. 4a is a partially sectional representation of the connection of two hollow profile-section supports with a third hollow section-profile support by means of a fast-action connecting element;

FIG. 4b is a partially sectional view from above of the arrangement of FIG. 4a;

FIG. 4c is an illustration corresponding to that of FIG. 4a of the connection of the fast-action connecting elements with the assistance of a wrench;

DETAILED DESCRIPTION OF THE PREFERRED EMBODIMENTS

Figure 1:
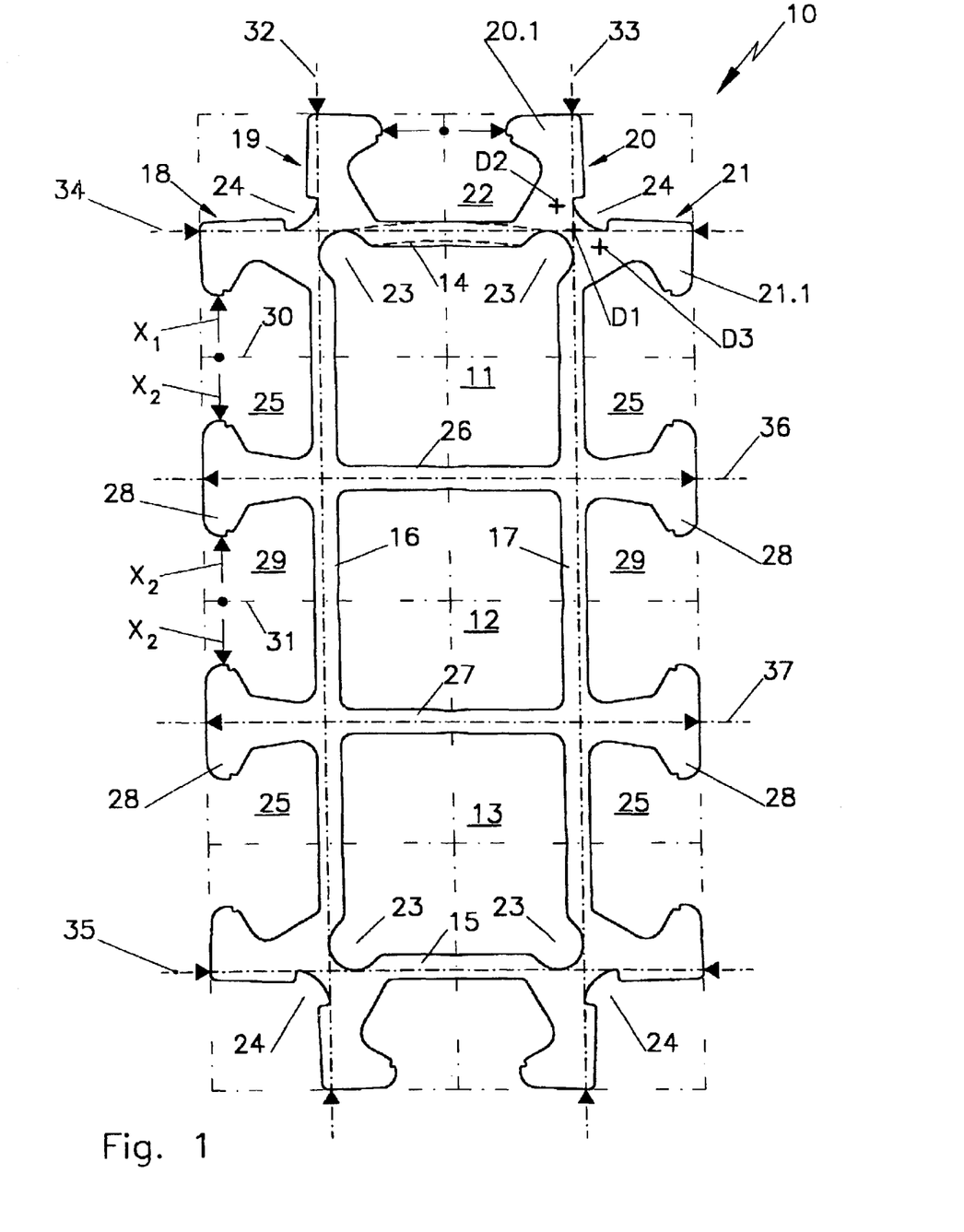
FIG. 1 is a cross sectional view through a hollow profile-section support having three chambers.

The hollow profile-section support 10 shown in FIG. 1 has an elongated, square shape and is subdivided into three square chambers 11, 12, and 13. In the corner regions of the narrow sides 14, 15 as well as the long sides 16, 17, spring-elastic ribs 18, 19, 20, 21 are disposed. The edge or peripheral ribs 19 and 20 close thereby a groove 22, provided with an undercut, for receiving fast-action connecting elements there between. In the corner between the side walls 16 and 14, 14 and 17, 17 and 15, and 15 and 16, respective inner corner grooves 23 are disposed. The inner and outer corner grooves 23 and 24, respectively, are disposed such that they enclose a rotational axis D1 for a spreading-apart movement of the ribs 20 and 21. By means of the peripheral undercut of the groove 23 as well as a groove 25 likewise having a peripheral undercut on the adjoining long side 17, the ribs 20 and 21 also have axes of rotation D2 and D3, about which the outer rib regions 20.1 and 21.1 are pivotable, when a fast-action connecting element is connected into the grooves 22 or 25. The grooves 23 and 24 ensure through the formation of the axis of rotation D1 for the ribs 20 and 21 that upon a spreading apart of these ribs 20, 21, an outward bound deformation (for example, represented in dotted line on the wall 14 in FIG. 1), and therewith, no transfer of force to the respective adjoining side 14 or 17 of the hollow profile-section support 10 occurs. By the axes of rotation D2 and D3, which are formed by the peripheral undercuts of the grooves 22, 24, 25, this force-related neutralization or balancing of the sides 14 and 17 upon connection of the fast-action connecting elements in the grooves 22 and 26 is increased. The peripheral undercuts in the grooves 24 ensure, in addition, that also in these grooves attachment elements can be anchored.

At respective positions, on which separating walls 26, 27 between the chambers 11, 12, and 13 meet on the side walls 16 and 17, ribs 28 are likewise disposed. They enclosed between them and the ribs 18, 19, 20, 21 in the corner regions of the hollow profile-section support 10 grooves of type 25 and between them and a further rigid rib 28, grooves of type 29. The grooves 25 are asymmetrical to their middle axis 30. The grooves 29, in contrast, are symmetrical to their middle axis 31. With the grooves 25, in addition, also the groove opening is asymmetrical to the middle axis 30. The opening section $X_1$, which faces the moveable ribs 18, 21, is smaller than the opening section $X_2$, which faces the rigid ribs 28. The section $X_2$ is therefore greater than the section $X_1$. The groove 29 has a groove opening with a width $2 \times X_2$. Therefore, since the section $X_2$ is greater than the section $X_1$, in spite of the rigid ribs 28, a connecting element can be introduced into the groove 25 without any problem. A connecting element introduced into the groove 29 having the width $2 \times X_2$ forms a counter support for the connecting element inserted into the adjoining groove 25, since each connecting element has a movement region, which requires either two deformable ribs 18, 19, 20, 21 or at least one such rib and more space $X_2$ on the other side for it. In this manner, all of the groove types 22, 25, and 29 can use the same connecting elements.

The spreadable ribs 18, 19, 20, 21 are slightly slanted in the direction of the groove inner side, which means that they are not adjusted outwardly after the connection of the fast-action connecting element, but rather are exactly perpendicular to the side walls 16, 14, 17. This feature means that on the front faces of these ribs 18, 19, 20, 21, acting forces on the profile-section support 10 are transferred and do not lead to a further bending of the ribs 18, 19, 20, and 21.

All of the ribs 18, 19, 20, 21, 28 and all corner grooves 23, 24 are arranged such that linear force transfer lines 32, 33, 34, 35 from one profile-section side 14, 16 to a respective, opposite profile-section side 15, 17, and the reverse, are provided. Thus, forces can be received from the front faces of the ribs 18, 19, 20, 21 and transferred to the opposite side, without leading to a deformation of the hollow profile-section support 10. Also, the ribs 28 lying in the extension of the separating walls 26, 27 make possible such linear force transfer lines 36, 37.

Figure 2:
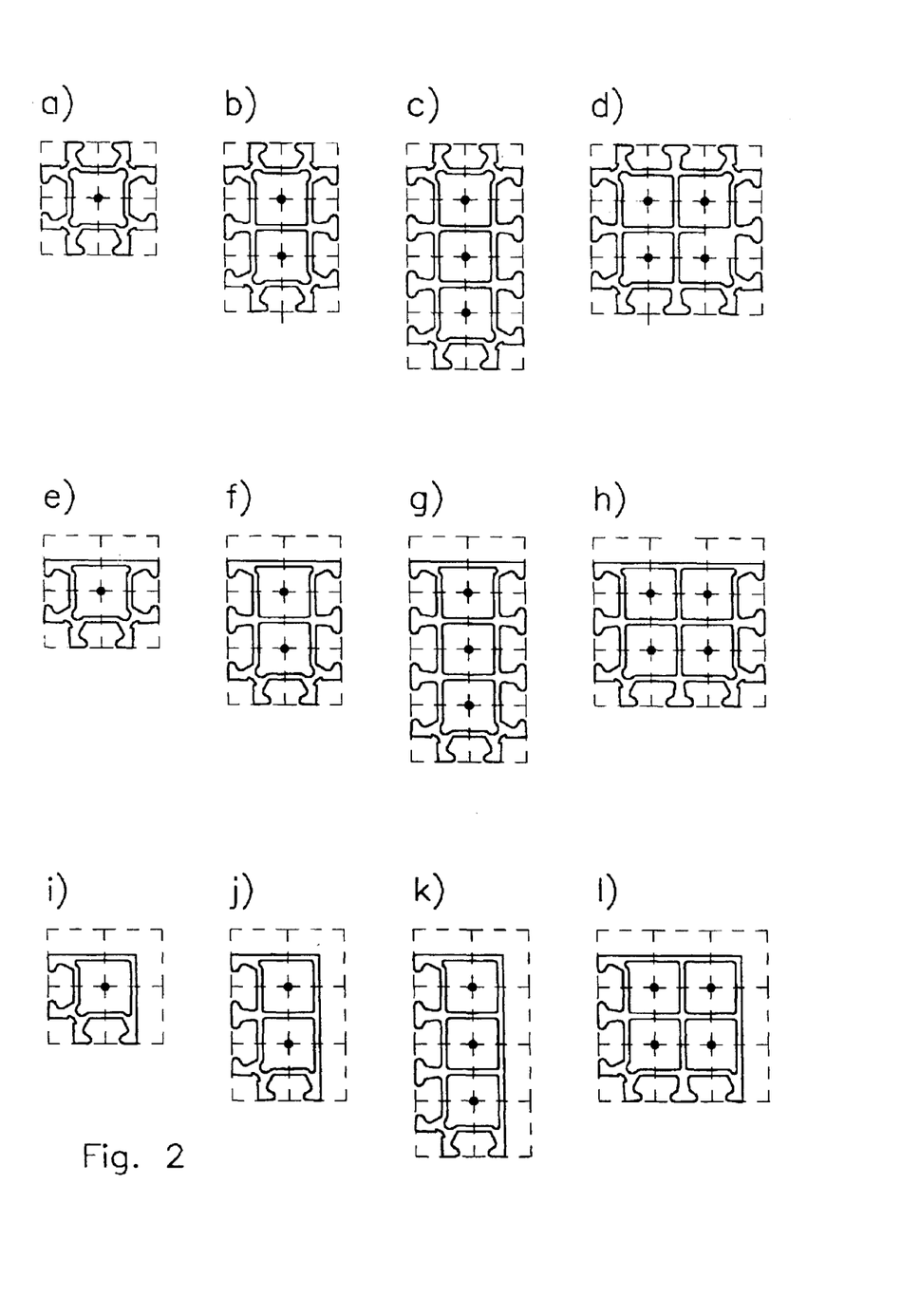
FIGS. 2a through 2l are different cross sectional shapes of hollow profile supports with square cross sections.

FIG. 2 shows a total of 12 different possibilities of the formation of the inventive hollow profile-section support with a square cross section. As FIGS. 2e through 2l show, all sides of the hollow profile-section do not have to be provided with ribs forming grooves.

Figure 3:
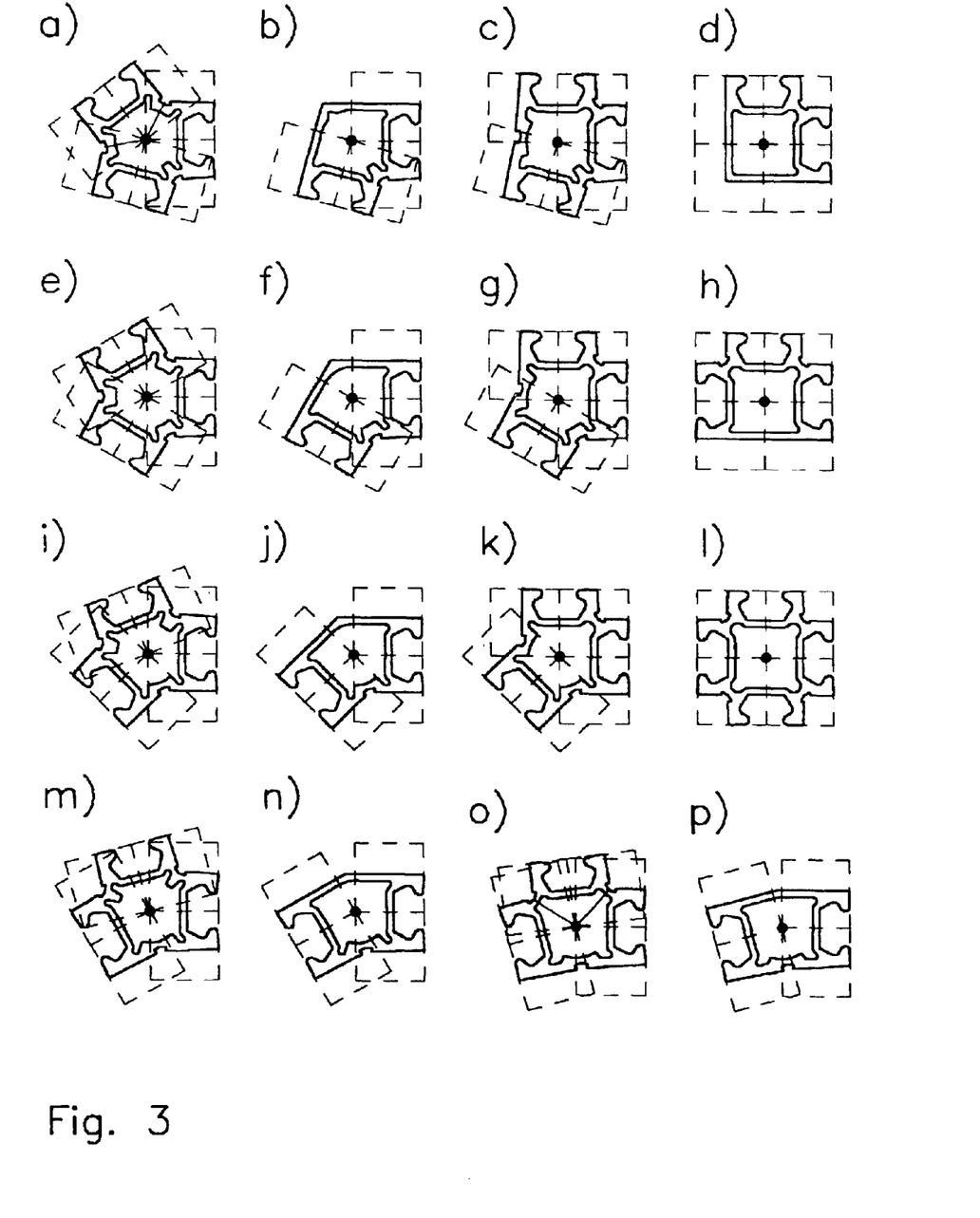

FIG. 3 illustrates that the hollow profile-section also can have a cross section that departs from the square shape. In this manner, also oblique-angled connections of wall parts, supports and the like are possible. Also, the non-square profile-section supports are provided, however, with inner and outer grooves in the corner regions as well as spreadable ribs, so that also, on these, a connection of fast-action connecting elements having the same mathematical relationship as with the square hollow profile-section supports and a force-related balancing of all of the profile-section sides is provided.

Figure 4:
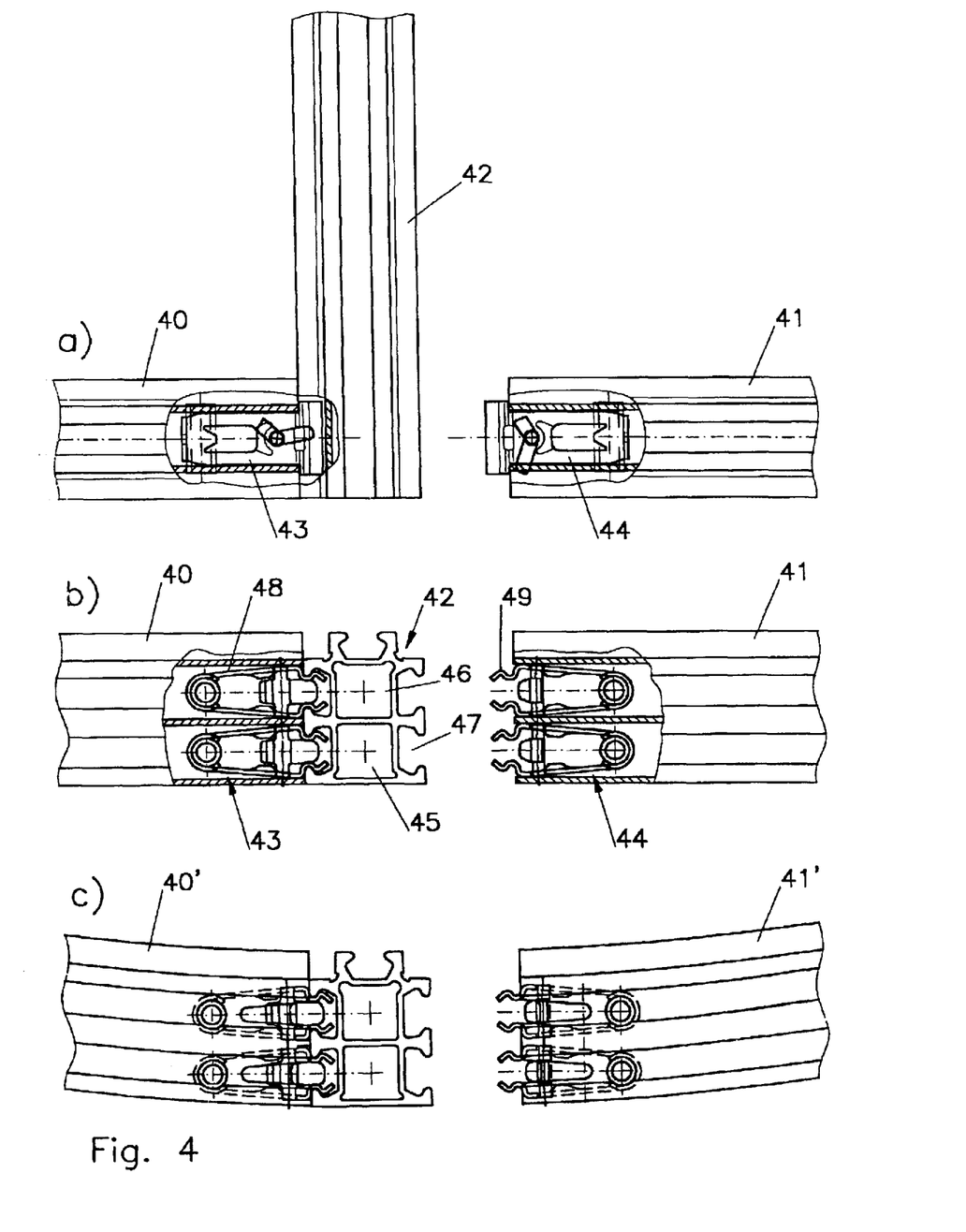

FIG. 4 illustrates the connection of two hollow profile-section supports 40, 41 with a third, perpendicularly arranged hollow profile-section support 42 by means of fast-action connecting elements 43, 44. As can be seen particularly well in FIG. 4b, the hollow profile-section support 42 has a square cross section with two chambers 45 and 46. In the outer grooves 47, the fast-action connecting elements 43 and 44 are anchored, which have U-shaped, bent flat spring elements 48, whose free ends are bent to locking catches, which in a slack state, are guidable into the grooves 47 and subsequently connectable by operation of a rotational body 50 (shown in FIGS. 5 and 6) by means of a wrench 51.

Figure 5:
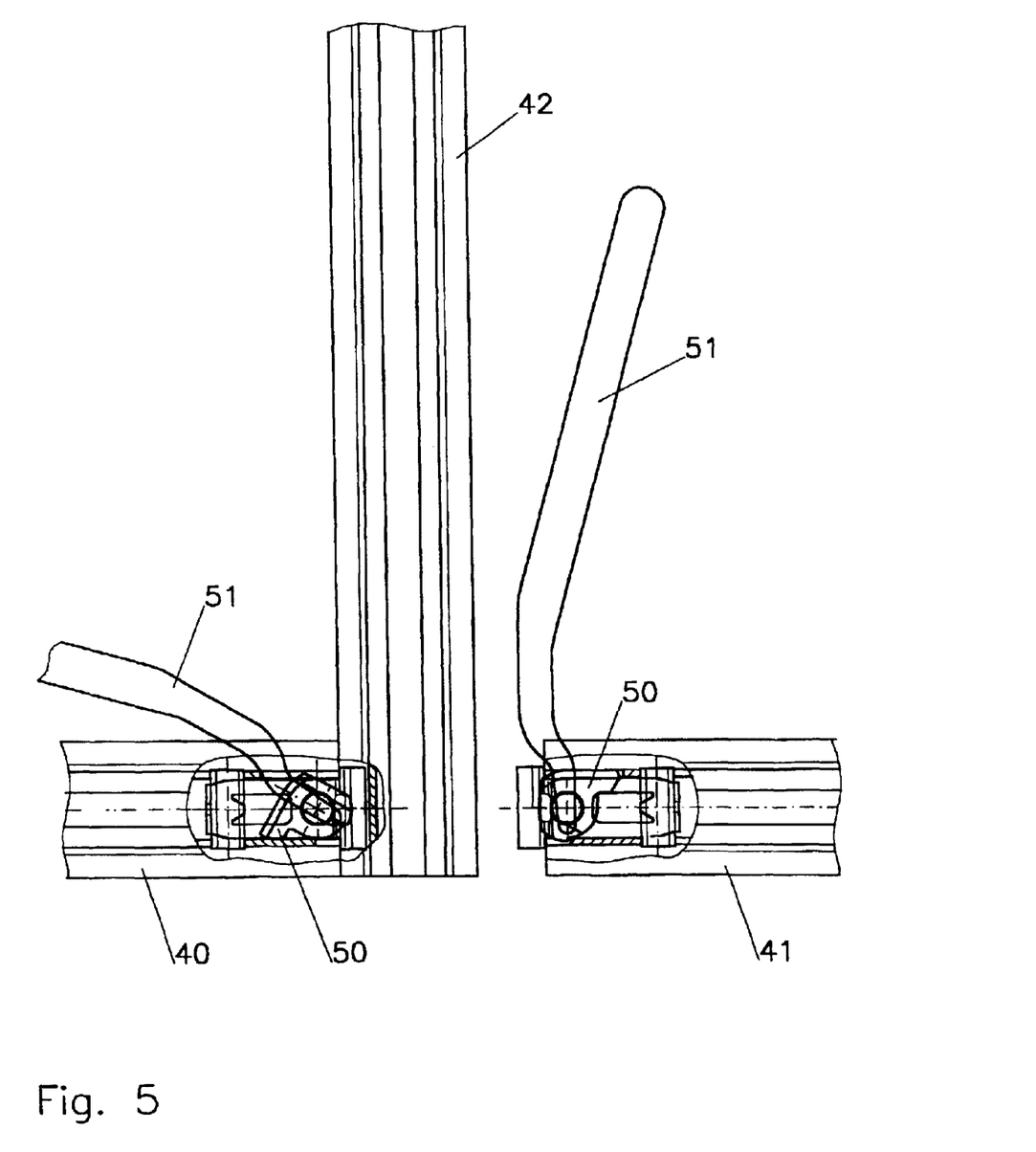
FIG. 5 shows an example of the support with the rotational body, as well as the wrench in a closed position.
Figure 6:
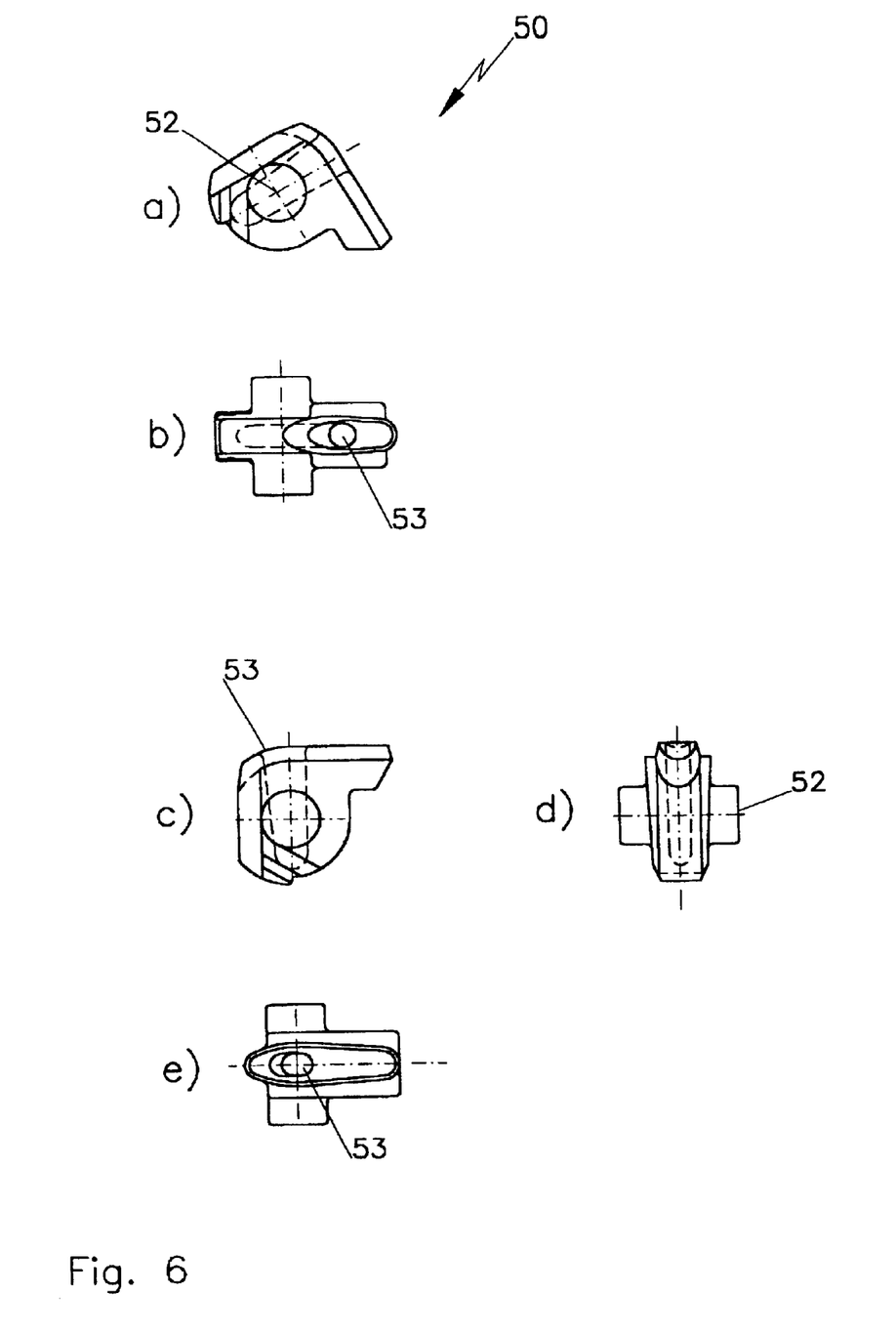
FIGS. 6a through 6e are detailed representations of the rotational body of the fast-action connecting elements of FIG. 5.

FIG. 5 shows an example of the support 41 with the rotational body, as well as the wrench 51 in a closed position. With the support 41, the rotational body 50 as well as the wrench are to be seen in the opening position. FIG. 5 also shows that the socket wrench 51 is very deeply insertable into the rotational body 50 and has an outer, simple square cross section, so that a simple introduction of the wrench can take place. Since not stop is provided for the frictional movement of the rotational body 50, the simple form of the wrench 51 also prevents breaking of the wrench.

FIGS. 6a through 6e illustrate the appearance of the rotational body 50. It is pivotable about an axis of rotation 52 and has an insertion opening 53 on its upper side for the socket wrench 51. FIGS. 6a and 6b shows the rotational body in the closed position and FIGS. 6c though 6e show the rotational body in the opened position.

Figure 7:
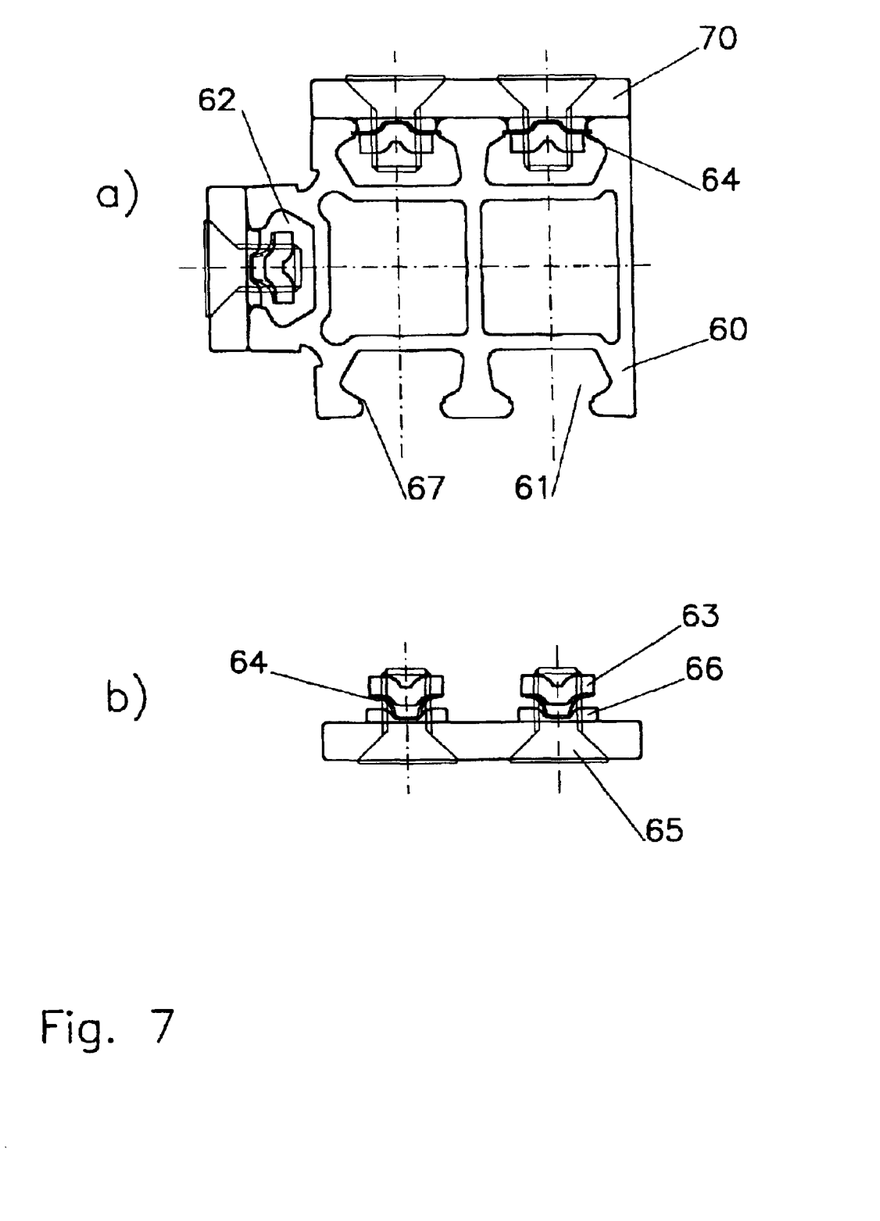
FIGS. 7a and 7b are a representation of the connection of plate-shaped components and a hollow profile-section support with the assistance of sliding blocks.

FIG. 7 illustrates the anchoring of plate-shaped components 70 on a hollow profile-section support 60 with outer grooves 61 and 62 having peripheral undercuts with the assistance of sliding blocks 63. The sliding blocks 63 are thus narrower than the opening of the grooves 61, 62. In a slack state, together with the flat spring elements 64, which in a slack sate likewise are narrower than the opening of the grooves 61, 62, they are insertable into the grooves 61 and 62. Subsequently, the sliding blocks are twisted through screwing on of screws 65 in the direction of the undercuts of the grooves 61, 62. This results in a spreading apart of the spring elements 64, which rest on the groove outer side on counter pieces 66. The outer diameter of the spring elements 64 is therefore greater than the groove opening and locks into small additional grooves 67 on the ribs limited by the grooves 61, 62.

Also, the sliding blocks 63 and the spring elements 64 enable introduction of each type of groove 61, 62, or 22, 25, 29 (FIG. 1) and are braced there. Likewise, like the fast-action connecting elements 43, 44, also the sliding blocks 63 with the spring elements 64 can be arranged parallel to one another and be inserted in parallel grooves 61 of the hollow profile-section support 60, since for their insertion, no turning of the sliding block 63 is required. In this manner, a stable assembly also of large-surface components on the hollow profile support elements 60 with multiple parallel grooves 61 is possible.

It will be understood that each of the elements described above, or two or more together, may also find a useful application in other types of constructions differing from the types described above.

While the invention has been illustrated and described herein as a profile-section support system, in particular, for industrial-fair and exhibition construction, with hollow profile-section supports, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A profile-section support system, comprising:
    hollow profile-section supports (10, 40, 41, 42, 60) of polygonal cross section, having at least one of outer side (14, 15, 16, 17) with edges provided with ribs (18, 19, 20, 21) defining grooves (22) with peripheral undercuts therebetween;
    additional parts selected from the group consisting of further profile-section supports (10, 40, 41, 42, 60) and other parts;
    connecting elements (43, 44, 63) anchored in said undercuts and connecting said additional parts, said connecting elements having corner regions with inner corner grooves (23), thereby allowing a spreading apart of the ribs (18, 19, 20, 21) with deformation of the at least one outer side (14, 15, 16, 17) wherein ribs are disposed on the at least one outer side (14, 16, 17) adjoining the hollow profile-section supports (10, 40, 41, 42, 60), and wherein two ribs (18, 19, 20, 21) on an edge between adjacent outer sides (14, 16, 17) of the hollow profile-section supports (10, 40, 41, 42, 80) define an outer corner groove (24).

2. The profile-section support system of claim 1, wherein the outer corner groove (24) has peripheral undercuts for receiving securing elements.

3. The profile-section support system of claim 1, wherein the inner and outer corner grooves (23, 24) are disposed such that between them, the inner and outer corner grooves define a pivot axis (D1) for a spreading motion of the two ribs (20, 21) that define the outer corner groove (24).

4. The profile-section support system of claim 2, wherein the peripheral undercuts of the grooves (22) on the outer sides of the hollow profile-section supports and the peripheral undercuts of the outer corner grooves (24) define pivot axes (D2, D2) for a pivoting motion of regions (20.1, 21.1) of the ribs (20, 21) that form the peripheral undercuts.

5. The profile-section support system of claim 3, wherein the ribs (20, 21) containing or defining the pivot axes (D1, D2, D3) are disposed at least slightly inclined in a direction of an inside of the groove.

6. The profile-section support system of claim 1, wherein the inner and outer corner grooves (23, 24) are disposed and shaped such that an impact or tensile stress on the face ends of the ribs (18, 19, 20, 21) is transmitted linearly to an opposite side (14, 15, 16, 17) of the hollow profile-section supports (10), and wherein no compression or expansion of the cross section of the hollow profile-section supports (10) occurs.

7. The profile-section support system of claim 1, wherein on portions of the ribs (20.1, 21.1) that define the undercuts of the grooves (22, 25, 29, 61) on the sides (14, 15, 16, 17) of the hollow profile-section supports, small additional grooves (67) are disposed for receiving edges of spring elements (64), wherein said spring elements cooperate with sliding blocks (63), wherein said blocks can be anchored in the groove (22, 25, 29, 61) formed by the ribs (18, 19, 20, 21).

8. The profile-section support system of claim 1, wherein the profile-section supports (10, 40, 41, 42, 60) are subdivided into a plurality of chambers (11, 12, 13).

9. The profile-section support system of claim 8, wherein the chambers (11, 12, 13) have an at least approximately square cross section.

10. The profile-section support system of claim 9, wherein the profile-section supports (10, 40, 41, 42, 60) have middle ribs (28) protruding outwardly at points where chamber partitions (26, 27) abut the outer profile walls (16, 17), wherein the middle ribs and/or the middle ribs and the outer ribs (18, 21) disposed on outer edge regions of the profile-section supports (10, 40, 41, 42, 60), define grooves (25, 29) with peripheral undercuts.

11. The profile-section support system of claim 10, wherein the middle ribs (28) are disposed rigidly, and wherein the grooves (25) defined between the middle ribs (28) and the outer ribs (28, 21) are asymmetrical with respect to a center axis (30).

12. The profile-section support system of claim 11, wherein groove openings ($X_1$, $X_2$) are disposed asymmetrically with respect to the center axis (30) of the grooves (25).

13. The profile-section support system of claim 10, wherein fast-action connecting elements (43, 44, 63) are anchorable in the grooves (25, 29), and wherein the fast-action connecting elements are also anchorable in side grooves (22) of the single-chamber hollow profile-section supports without middle ribs.

14. The profile-section support system of claim 1, wherein the connecting elements (43, 44, 63) have a leaf spring (48) bent into a U, wherein legs of the U are shaped into locking lugs (49) that engage the groove (22, 25, 219, 47, 61), provided with an undercut, and wherein legs of the U can be braced by means of spreading apart of the legs in the groove (22, 25, 29, 47, 61) by means of a body of rotation (50), wherein said body of rotation is actuatable by a wrench (51).

15. The profile-section support system of claim 14, wherein no stops for limiting a closing position of the body of rotation (50) are disposed on the fast-action connecting element (43, 44).

16. The profile-section support system of claim 14, wherein the body of rotation (50) is actuatable by means of a socket wrench (51) having a rectangular cross section.

\* \* \* \* \*